United States Patent Office 2,951,141
Patented Aug. 30, 1960

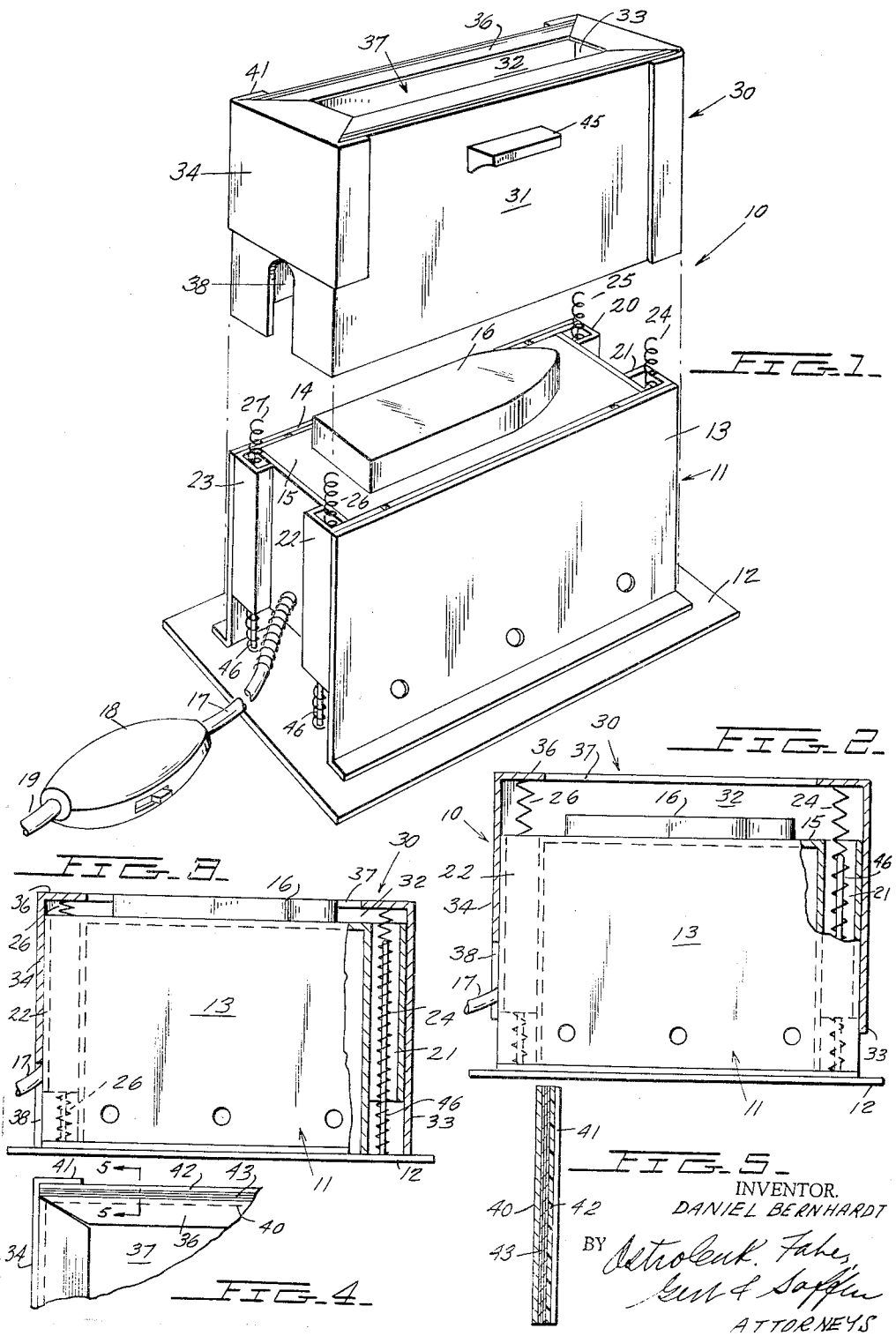

2,951,141

PACKAGE SEALER

Daniel Bernhardt, 287 Cornwall Road, Glen Rock, N.J.

Filed Sept. 11, 1958, Ser. No. 760,484

1 Claim. (Cl. 219—19)

My present invention relates to a package sealing device and more particularly to a heat sealing member so arranged that the user may readily close the seams of a package wrapped in any thermoplastic or other heat sensitive member by the utilization of a heat sealing element while at the same time the hands and the fingers of the user are protected from accidental contact with the heat sealing mechanism.

While heat sealing devices are known, these have been associated with high speed factory production either of empty bags or packages or of filled bags and packages. It has long been known, for instance, that a filled bag or package may be made from a continuous web by folding the web into tubular form and moving the seam of the tube past a heating device then cutting off one end of the web, heat sealing that end, then filling the tube through the open end and heat sealing the open end. The last two steps have often been performed separately at a different location; but the entire sequence of operations have been performed by continuous mechanisms where no requirement was present to protect the operator from the heat sealing member since it was never intended that the operator manipulate anything in close adjacency to the heat sealing member.

Where, however, packages are sealed at the point of use, high speed and continuous production mechanisms cannot be used. Instead, devices have been used such as hot plates, flat irons or soldering irons. That is, in some stores where food is to be sealed in packages of thermo-plastic material, a number of packages are manually sealed for the day's expected turn-over, or in some cases, for the next hour's expected turn-over. The prior devices are difficult to use and are not adapted for rapid production. In restaurants having out-going order service thermo-plastic wrapping for sandwiches has been tried and then abandoned because the problem of sealing these packages could not be readily overcome.

My invention contemplates a heat sealing device for packages in which the heating element initially adjusted for the proper temperature is supported on a base; and around this base, over the heating element, is placed a vertically movable shield having a cut-out on its upper surface substantially matching the heat sealing element, the shield being resiliently supported above the heat sealing element. When a package is placed thereon, with the seam of the package aligned with the slot of the shield and the package pressed down momentarily, the seam is brought into contact with the heat sealing element which closes the seam; and when the downward pressure on the package is removed the shield rises once more. While various hinged arrangements have been used for spot sealing, my invention by providing a shield which is translatorily movable in a vertical direction and which has a continuous slot, provides a simplified hermetic seam closing device for a package which requires merely placing the package on top of the unit, pressing down momentarily and removing the package.

The object of my invention is the provision of a heat sealing, seam closing device for a package having a vertically translatable shield and a slot in the top of the shield defining the heat sealing element; the slot in the top of the shield and the heat sealing element being moved into the same plane only when pressure is applied to a package placed thereon.

The foregoing and other objects of my invention will become apparent in the following description and drawings in which:

Figure 1 is an expanded view in perspective of my novel heat sealing device.

Figure 2 is a longitudinal section through my novel heat sealing device showing the shield in the raised position which it normally assumes.

Figure 3 is a view corresponding to that of Figure 2 showing the shield of my novel device depressed to the position which it assumes when pressure is applied to a package to be sealed is placed thereon.

Figure 4 is a cross-sectional view taken on line 4—4 of Figure 1 looking in the direction of the arrows.

Figure 5 is a cross-sectional view taken on line 5—5 of Figure 4 looking in the direction of the arrows.

Referring now to the figures, my novel heat sealing device 10 comprises a base member 11 mounted in any suitable manner on a platform 12; the base 11, in the embodiment shown, comprises a pair of side plates 13, 14 secured to the sides of the heat element support unit 15. A heating element 16 is mounted on the support 15, the heating element being preferably electrical and being connected to the electric cord 17, switch 18, and cord 19, to an appropriate electrical outlet. At each corner of the base 11 a vertical channel 20, 21, 22, 23 is provided to house and support the vertical compression springs 24, 25, 26, 27.

The shield 30 is provided with sides 31, 32, 33, 34 of insulating material. The top of the shield is provided with a flange forming a frame 36 defining the opening or slot 37 somewhat larger than the heating element 16. The shield 30 is also provided with a vertical slot 38 which permits it to move with respect to cord 17 when it is mounted on the base 11. When the shield 30 is placed over the base 11, the upper ends of the springs 24–27 bear against the underside of frame 36 of shield 30. The lower ends of the springs are supported on the platform 12 while the springs are retained in position by the channels 20–23. Spring guides 46 are also provided secured to the base to prevent deflection of the springs during depression of the shield. It will thus be seen from Figure 2 that the shield 30 is supported substantially above the heating element 16. The shield is also provided with finger tabs 45 of insulating material to permit the operator to depress the shield by finger pressure while holding a flexible package on the shield.

When a package is placed on the top of the shield 30, with the seam thereof aligned with the opening 37, and the package is pressed down, the springs are pressed from the position of Figure 2 to the position of Figure 3 until the lower edges of the side walls of shield 30 engage the base 12. Also at that time the bottom of the package to be sealed is in contact with the heating element. The seal is made at the bottom of the package against the heating element. At this time, the heating element is co-planar with slot 37 and heat is applied to the seam of the package. Thus, where a sandwich on a tray is to be wrapped, the thermoplastic material is first placed around the sandwich, in tubular form, and the seam pressed down on the heating device; then the wrapping is turned under to form another seam which is again pressed down on the heating device. The surface of the shield is used as a support for the package while the second folds are made on the package, thereby eliminating the necessity of removing the package from the sealer until it is completely wrapped. There is no danger of scorching the thermplastic material at this point since on the removal of a downward pressure, the package is elevated to a safe distance from the heating element. Normally with devices available today, the package must be removed for the next seam. The top of the shield is in effect a little work table that is why "pressure" should be exerted to press the package down.

Each time a wrapper forms a seam manually, he need merely press the package down on the heating device to seal it.

The shield 30 may be a molded insulating unit or it may, as shown in Figures 4 and 5, have an interior reflecting metal surface 40, an exterior radiating metal surface 41 and interior layers of an insulating plastic 42 and asbestos 43.

By this means, therefore, the operator making a package need not use a soldering iron, a hot plate or a flat iron, but is provided with a simple heat sealing device in which a shield protects the operator against accidental burns and which has a heating element, accessible only when a package is depressed on the unit, adapted for the sealing of the thermoplastic material which forms the wrapper.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claim.

I claim:

A heat sealing device for packages, said device comprising a base; a heated element supported on said base; a shield mounted on said base and movable with respect to said base in a direction normal to the plane of the heated element; said shield having a table section parallel to the heated element; said shield being resiliently mounted on said base with said last mentioned section spaced from said heated element; an opening in said section through which said heated element is accessible; said shield being movable by manual pressing of a package thereagainst to a position where the heated element is substantially coplanar with said table section; said resilient mounting returning said shield to said first mentioned position; said base and shield being arranged so that the shield is telescopically mounted on said base.

References Cited in the file of this patent
UNITED STATES PATENTS

| | | |
|---|---|---|
| 1,195,721 | Post | Aug. 22, 1916 |
| 2,625,201 | Smith | Jan. 13, 1953 |
| 2,638,964 | Andina | May 19, 1953 |
| 2,641,304 | Biddinger et al. | June 9, 1953 |
| 2,847,552 | Gates | Aug. 12, 1958 |